United States Patent
Lee et al.

(10) Patent No.: US 9,297,703 B2
(45) Date of Patent: Mar. 29, 2016

(54) TEMPERATURE SENSING DEVICE AND METHOD OF DRIVING THEREOF

(71) Applicant: Samsung Display Co., Ltd., Yongin, Gyeonggi-Do (KR)

(72) Inventors: Gil-Jae Lee, Yongin (KR); Choong-Sun Shin, Yongin (KR)

(73) Assignees: Samsung Display Co., Ltd., Samsung-ro, Giheung-Gu, Yongin-si, Gyeonggi-Do (KR); LDT INC., Seobuk-Gu, Cheonan, Chungnam (KR)

( * ) Notice: Subject to any disclaimer, the term of this patent is extended or adjusted under 35 U.S.C. 154(b) by 500 days.

(21) Appl. No.: 13/705,439

(22) Filed: Dec. 5, 2012

(65) Prior Publication Data

US 2013/0343428 A1   Dec. 26, 2013

(30) Foreign Application Priority Data

Jun. 21, 2012 (KR) .................. 10-2012-0066839

(51) Int. Cl.
G01K 7/00 (2006.01)
G01K 7/32 (2006.01)

(52) U.S. Cl.
CPC ... *G01K 7/00* (2013.01); *G01K 7/32* (2013.01)

(58) Field of Classification Search
USPC ........................ 374/170, 110, 112
See application file for complete search history.

(56) References Cited

U.S. PATENT DOCUMENTS

| 5,899,570 A | 5/1999 | Darmawaskita et al. |
| 2002/0150141 A1 | 10/2002 | Kishi |
| 2009/0091373 A1 | 4/2009 | Kiyohara |
| 2009/0096495 A1 | 4/2009 | Keigo |
| 2010/0189160 A1* | 7/2010 | Kim et al. ............ 374/170 |
| 2011/0057736 A1 | 3/2011 | Badillo |
| 2013/0208763 A1* | 8/2013 | Uwe et al. ............ 374/171 |

FOREIGN PATENT DOCUMENTS

| KR | 10-2002-0008448 | 1/2002 |
| KR | 10-2008-0090275 | 10/2008 |
| KR | 10-2010-0061900 | 6/2010 |

* cited by examiner

*Primary Examiner* — Mirellys Jagan
(74) *Attorney, Agent, or Firm* — Robert E. Bushnell, Esq.

(57) ABSTRACT

A temperature sensing device includes a first frequency generator for generating a first clock signal having a first frequency that is constant regardless of a temperature; a second frequency generator for generating a second clock signal having a second frequency that is changed according to the temperature; and a data holding unit for outputting a temperature code indicating a number of pulses of the second clock signal counted for a reference time at which a number of pulses of the first clock signal reaches a predetermined threshold. The temperature sensing device does not require a reference clock signal input from the outside and is insensitive to the change in the process, thereby being capable of improving the performance of the temperature sensing device.

25 Claims, 12 Drawing Sheets

TEMPERATURE SENSING DEVICE AND METHOD OF DRIVING THEREOF

CLAIM OF PRIORITY

This application makes reference to, incorporates the same herein, and claims all benefits accruing under 35 U.S.C. §119 from an application earlier filed in the Korean Intellectual Property Office on 21 Jun. 2012 and there duly assigned Serial No. 10-2012-0066839.

BACKGROUND OF THE INVENTION

1. Field of the Invention

An embodiment of the present invention relates to a temperature sensing device and a method of driving the temperature sensing device, and more particularly, to a temperature sensing device having an improved performance at a lower temperature and a method of driving the temperature sensing device.

2. Description of the Related Art

A display area of a display device includes pixels connected to scan lines and data lines which are arranged approximately in a form of a matrix. In order to display an image, the display device sequentially applies a scan signal of a gate-on voltage to the scan lines and applies a data voltage corresponding to the scan signal of the gate-on voltage to the data lines. A pixel includes a switching transistor that is turned on according to the scan signal of the gate-on voltage and a driving transistor that flows out a pixel current according to the data voltage.

The transistor may be a kind of semiconductor devices formed by joining a p-type semiconductor and an n-type semiconductor with three layers. The semiconductor device generally exhibits a temperature characteristic in that, when temperature of the semiconductor device decreases, an operation speed of the semiconductor device deteriorates and current consumption increases.

Recently, the semiconductor devices are widely used in almost all electronic devices, as well as in display devices. The performance of an electronic device may be varied according to a temperature characteristic of the semiconductor devices. In order to improve the performance of the electronic device, it is necessary to correct the temperature characteristic of the semiconductor device.

To this end, a temperature sensing device capable of measuring a temperature of an electronic device is required.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of the present invention provides a temperature sensing device capable of measuring a temperature of an electronic device and a method of driving the temperature sensing device.

An embodiment of the present invention provides a temperature sensing device including a first frequency generator for generating a first clock signal having a first frequency that is constant regardless of a temperature; a second frequency generator for generating a second clock signal having a second frequency that is changed according to the temperature; and a data holding unit for outputting a temperature code indicating a number of pulses of the second clock signal counted for a reference time at which a number of pulses of the first clock signal reaches a predetermined threshold.

The temperature sensing device may further include a first counter for generating a first number signal by counting the number of pulses of the first clock signal.

The temperature sensing device may further include an end detector for receiving the first number signal and outputting an end flag when a value of the first number signal is increased to a threshold.

The temperature sensing device may further include a second counter for generating a second number signal by counting the number of pulses of the second clock signal.

The temperature sensing device may further include a controller for transferring a driving start signal to the first frequency generator and the second frequency generator.

The temperature sensing device may further include a start detector for generating a start signal when the driving start signal is received.

The temperature sensing device may further include a synchronization unit for generating a first synchronization signal according to the start signal and generating a second synchronization signal according to the end flag.

The end detector may read the value of the first number signal at a time point at which the first synchronization signal is received, and transfer the end flag to the synchronization unit when the value of the first number signal is increased to a threshold.

The temperature sensing device may further include a data holding unit for receiving the second number signal from the second counter, storing the first value of the second number signal at the time point at which the first synchronization signal is received, and calculating the number of pulses of the second clock signal counted for the reference time by subtracting the first value from a second value of the second number signal at a time point at which the second synchronization signal is received.

The temperature sensing device may further include a complementary to absolute temperature (CTAT) bias unit for applying a CTAT bias voltage at a constant level regardless of a temperature to the first frequency generator.

The temperature sensing device may further include a proportional to absolute temperature (PTAT) bias unit for applying a PTAT bias voltage changed according to a temperature to the second frequency generator.

The second frequency generator may include a plurality of oscillators for feeding back and inputting the second clock signal in response to the PTAT bias voltage, and outputting the second clock signal.

Any one of the plurality of oscillators may include a first PMOS transistor, a second PMOS transistor, a third NMOS transistor, and a fourth NMOS transistor connected in series between a power source voltage and a ground, and a first capacitor including one electrode connected to an output terminal between the second PMOS transistor and the third NMOS transistor and another electrode connected to a ground.

Another one of the plurality of oscillators may include the first PMOS transistor, the second PMOS transistor, the third NMOS transistor, and the fourth NMOS transistor connected in series between a power source voltage and the ground, and a second capacitor including one electrode connected to an output terminal between the second PMOS transistor and the third NMOS transistor and another electrode connected to the power source voltage.

Each of the plurality of oscillators may include a first PMOS transistor, a second PMOS transistor, a third NMOS transistor, and a fourth NMOS transistor connected in series between a power source voltage and a ground, and a capacitor including one electrode connected to an output terminal between the second PMOS transistor and the third NMOS transistor and another electrode connected to a power source voltage.

Each of the plurality of oscillators may include a first PMOS transistor, a second PMOS transistor, and a third NMOS transistor connected in series between a power source voltage and a ground, and a capacitor including one electrode connected to an output terminal between the second PMOS transistor and the third NMOS transistor and another electrode connected to the ground.

Each of the plurality of oscillators may include a second PMOS transistor, a third NMOS transistor, and a fourth NMOS transistor connected in series between a power source voltage and a ground, and a capacitor including one electrode connected to an output terminal between the second PMOS transistor and the third NMOS transistor and another electrode connected to the ground.

Another embodiment of the present invention provides a method of driving a temperature sensing device, including steps of generating a first clock signal having a first frequency that is constant regardless of a temperature; generating a second clock signal having a second frequency that is changed according to the temperature; counting a number of pulses of the first clock signal; counting a number of pulses of the second clock signal; detecting a reference time at which the number of pulses of the first clock signal reaches a threshold; and outputting a temperature code indicating a number of pulses of the second clock signal counted for the reference time.

The method may further include a step of generating a driving start signal for enabling generation of the first clock signal and the second clock signal.

The method may further include generating a start signal for starting sensing of the temperature according to the driving start signal, and generating a first synchronization signal for starting measurement of the reference time according to the start signal.

The counting of the number of pulses of the first clock signal may include increasing a value of a first number signal by one whenever one pulse of the first clock signal is counted and outputting the first number signal.

The detecting of the reference time may include outputting an end flag when the value of the first number signal at a time point at which the first synchronization signal is generated is increased to a threshold.

The counting of the number of pulses of the second clock signal may include increasing a value of a second number signal by one whenever one pulse of the first clock signal is counted and outputting the second number signal.

The outputting of the temperature code may include calculating the number of pulses of the second clock signal counted for the reference time by subtracting the first value of the second number signal at the time point at which the first synchronization signal is generated from a second value of the second number signal at a time point at which the end flag is output.

The method may further include when the temperature code is output, generating a driving stop signal for stopping the generation of the first clock signal.

The temperature sensing device does not require a reference clock signal input from the outside and is insensitive to the change in the process, thereby being capable of improving the performance of the temperature sensing device.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
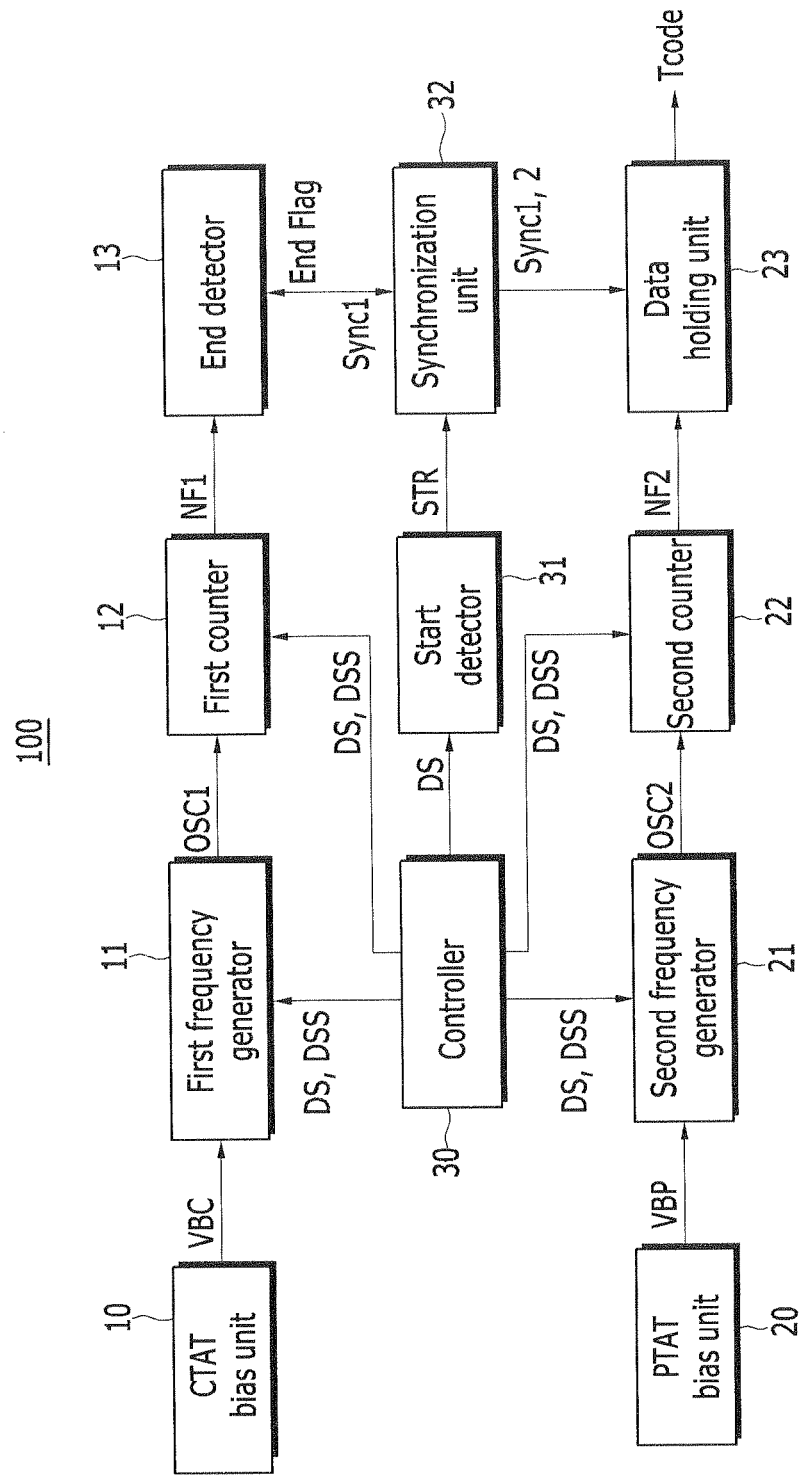
FIG. 1 is a block diagram illustrating a construction of a temperature sensing device constructed with the principle of an embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in several exemplary embodiments, a constituent element having the same configuration will be representatively described in a first exemplary embodiment by using the same reference numeral, and other configurations different from those of the first exemplary embodiment will be described in other exemplary embodiments.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 is a block diagram illustrating a construction of a temperature sensing device constructed with the principle of an embodiment of the present invention.

In reference to FIG. 1, a temperature sensing device 100 includes a complementary to absolute temperature (CTAT) bias unit 10, a first frequency generator 11, a first counter 12, an end detector 13, a proportional to absolute temperature (PTAT) bias unit 20, a second frequency generator 21, a second counter 22, a data holding unit 23, a controller 30, a start detector 31, and a synchronization unit 32.

The CTAT bias unit 10 generates a CTAT bias voltage VBC of a constant level regardless of a temperature. The CTAT bias voltage VBC includes at least one of a first CTAT bias voltage VBC1 and a second CTAT bias voltage VBC2.

The first frequency generator 11 converts the CTAT bias voltage VBC into a first clock signal OSC1 having a first frequency. The first frequency generator 11 is a circuit for outputting a clock signal having a frequency according to an input voltage level. Since the CTAT bias voltage VBC of a constant level is applied to the first frequency generator 11, the first clock signal OSC1 has a constant first frequency.

The first counter 12 generates a first number signal NF1 of the first clock signal OSC1 by counting the number of pulses of the first clock signal OSC1. The first counter 12 may increase a value of the first number signal NF1 by one whenever one pulse of the first clock signal OSC1 is counted.

The end detector 13 receives the first number signal NF1 of the first clock signal OSC1 and outputs an end flag when the number of pulses of the first clock signal OSC1 reaches a predetermined threshold. The end detector 13 may read a value of the first number signal NF1 at a time when a first synchronization signal Sync1 is received in the first synchronization unit 32 and output the end flag when the value of the first number signal NF1 is increased to a threshold. Since the first clock signal OSC1 has the constant first frequency, the time at which the number of pulses of the first clock signal OSC1 reaches the predetermined threshold is a predetermined reference time (Tref). In other words, within a predetermined reference time (Tref), the number of pulses of the first clock signal OCS1 remains a constant value.

A PTAT bias unit 20 generates a PTAT bias voltage VBP that is changed according to a temperature. The PTAT bias voltage VBP includes at least one of a first PTAT bias voltage VBP1 and a second PTAT bias voltage VBP2.

The second frequency generator 21 converts the PTAT bias voltage VBP into a second clock signal OSC2 having a second frequency. The second frequency generator 21 is a circuit for outputting a clock signal having a frequency according to an input voltage level. Since the PTAT bias voltage VBP changed according to a temperature is applied to the second frequency generator 21, the second clock signal OSC2 has the second frequency changed according to the temperature.

The second counter 22 generates a second number signal NF2 of the second clock signal OSC 2 by counting the number of pulses of the second clock signal OSC2. The second counter 22 increases a value of the second number signal NF2 by one whenever one pulse of the second clock signal OSC2 is counted.

The controller 30 controls a general operation of the temperature sensing device 100. The controller 30 may drive the temperature sensing device 100 by transferring a driving start signal (DS) to the first frequency generator 11, the first counter 12, the second frequency generator 21, and the second counter 22 in order to start the temperature measurement.

In this case, the controller 30 transfers the driving start signal (DS) to a start detector 31. Then, when the temperature measurement is completed, the controller 30 may stop the driving by transferring a driving stop signal (DSS) to the first frequency generator 11, the first counter 12, the second frequency generator 21, and the second counter 22.

The start detector 31 generates a start signal (STR) according to the driving start signal (DS). The start detector 31 starts sensing of a temperature by transferring the generated start signal (STR) to the synchronization unit 32.

The synchronization unit 32 synchronizes a temperature sensing start point and a temperature sensing end point by transferring a first synchronization signal Sync1 and a second synchronization signal Sync2 to the end detector 13 and the data holding unit 23. The synchronization unit 32 may synchronize a time point at which the end detector 13 starts the reception of the first number signal NF1 of the first clock signal OSC1 and a time point at which the data holding unit 23 starts the reception of the second number signal NF2 of the second clock signal OSC2 by generating the first synchronization signal Sync1 according to the start signal (STR) and simultaneously transferring the generated first synchronization signal Sync1 to the end detector 13 and the data holding unit 23.

Then, when the synchronization unit 32 receives the end flag from the end detector 13, the synchronization unit 32 enables generation of a temperature code Tcode indicating the number of pulses of the second clock signal OSC2 counted for the reference time Tref by transferring the second synchronization signal Sync2 to the data holding unit 23.

The data holding unit 23 stores a first value of the second number signal NF2 at the time point at which the first synchronization signal Sync1 is received. Then, the data holding unit 23 stores a second value of the second number signal NF2 at the time point at which the second synchronization signal Sync2 is received. The data holding unit 23 may calculate the number of pulses of the second clock signal OSC2 counted for the reference time Tref by subtracting the first value from the second value of the second number signal NF2. The data holding unit 23 outputs the temperature code Tcode indicating the number of pulses of the second clock signal OSC2 counted for the reference time Tref.

The temperature sensing device 100 senses a temperature by setting the reference time Tref based on the first clock signal OSC1 irrelevant to a temperature and counting the number of pulses of the second clock signal OSC2 changed according to a temperature for the reference time Tref, so that the temperature sensing device 100 may linearly indicate the sensed temperature.

In one embodiment, the temperature sensing device 100 may measure and determine a temperature of an electric device by establishing a relation between the temperature of the electric device and the temperature code Tcode.

In another embodiment, the temperature sensing device 100 may measure and determine a temperature of an electric device by establishing a relation between the temperature of the electric device and the frequency of the second clock signal OSC2.

Figure 2:
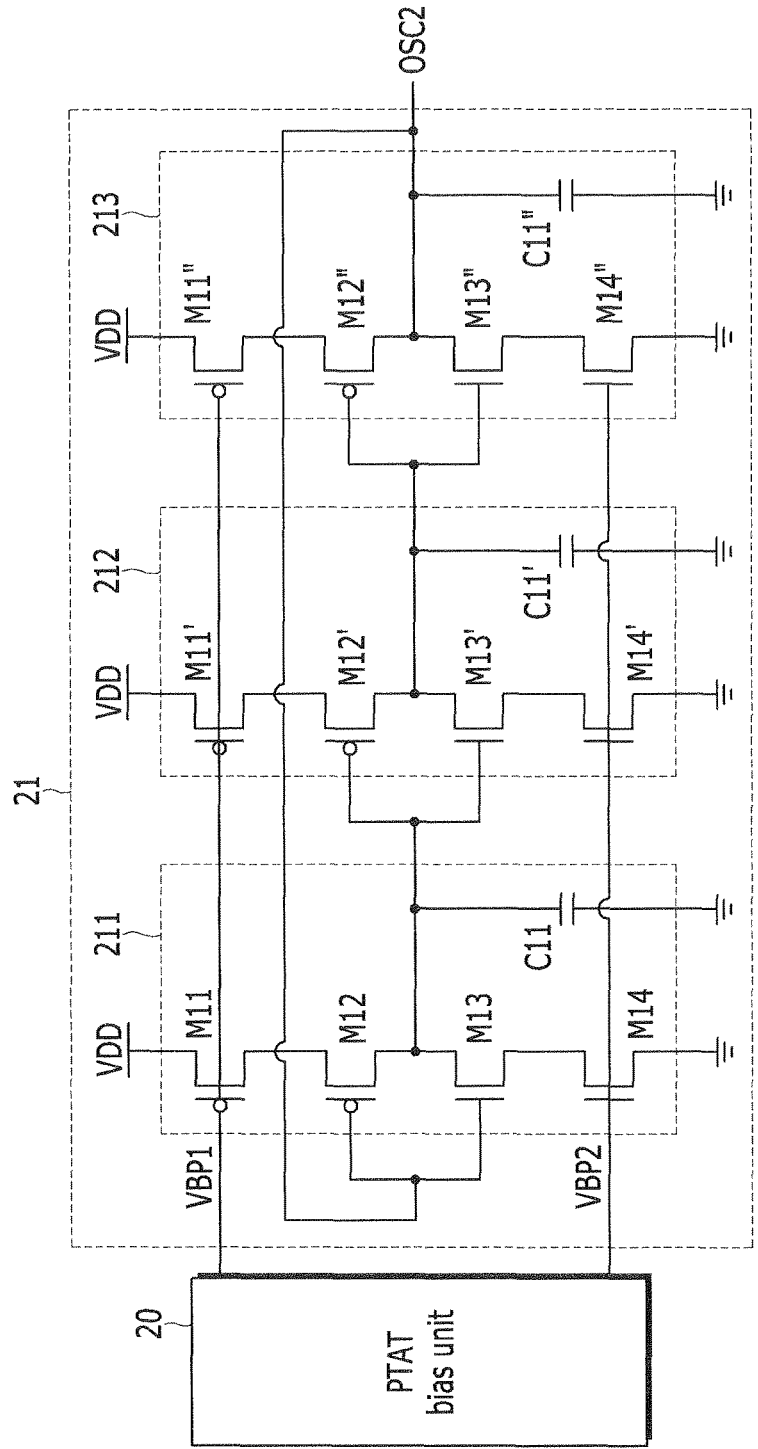
FIG. 2 is a circuit diagram illustrating a second frequency generator constructed with the principle of an embodiment of the present invention.

FIG. 2 is a circuit diagram illustrating the second frequency generator constructed with the principle of an embodiment of the present invention.

In reference to FIG. 2, the second frequency generator 21 includes oscillators 211, 212, and 213 for feeding back and inputting the second clock signal OSC2 in response to the PTAT bias voltage VBP of the PTAT bias unit 20, and outputting the second clock signal OSC2.

The first oscillator 211 includes a first transistor M11, a second transistor M12, a third transistor M13, a fourth transistor M14, which are connected in series between a power source voltage VDD and a ground, and a capacitor C11 connected to an output terminal. The first transistor M11 and the second transistor M12 are p-channel metal oxide semiconductor (PMOS) transistors, and the third transistor M13 and the fourth transistor M14 are n-channel metal oxide semiconductor (NMOS) transistors.

A gate electrode of the first transistor M11 is connected to the first PTAT bias voltage VBP1 of the PTAT bias unit 20, and a gate electrode of the fourth transistor M14 is connected to the second PTAT bias voltage VBP2 of the PTAT bias unit 20. A gate electrode of the second transistor M12 and a gate electrode of the third transistor M13 are connected to the output terminal of the third oscillator 213.

The capacitor C11 includes one electrode connected to the output terminal between the second transistor M12 and the third transistor M13 and another electrode connected to a ground.

The second oscillator 212 is configured in the same manner as the first oscillator 211. However, a gate electrode of a second transistor M12' and a gate electrode of a third transistor M13' are connected to an output terminal of the first oscillator 211.

The third oscillator 213 is configured in the same manner as the first oscillator 211. However, a gate electrode of a second transistor M12" and a gate electrode of a third transistor M13" are connected to an output terminal of the second oscillator 212.

Now, an operation of the second frequency generator 21 will be described.

When a temperature increases, a voltage level of the first PTAT bias voltage VBP1 and a voltage level of the second PTAT bias voltage VBP2 output from the PTAT bias unit 20 go down.

A quantity of the current flowing the first transistors M11, M11', and M11" and the fourth transistors M14, M14', or M14" of the respective oscillators 211, 212, and 213 decreases and a quantity of the current output from the respective oscillators 211, 212, and 213 also decreases. Accordingly, a charge time and a discharge time of the capacitors C11, C11', and C11" connected to the output terminal of the respective oscillators 211, 212, and 213 increase. As the charge time and the discharge time of the capacitors C11, C11', and C11" become longer, a cycle of the second clock signal OSC2 output to the output terminal of the third oscillator 213 also becomes longer. The cycle T of the second clock signal OSC2 corresponds to a sum of the charge time t1 and the discharge time t2 of the capacitors C11, C11', and C11".

When a temperature drops, the voltage levels of the first PTAT bias voltage VBP1 and the second PTAT bias voltage VBP2 output from the PTAT bias unit 20 increase. The quantity of the current flowing the first transistors M11, M11', and M11" and the fourth transistors M14, M14', and M14" of the respective oscillators 211, 213, and 213 increases, and the quantity of the current output from the respective oscillators 211, 212, and 213 also increases. Accordingly, the charge time and the discharge time of the capacitors C11, C11', and C11" connected to the output terminals of the respective oscillators 211, 212, and 213 become shorter. According to the shortening of the charge time and the discharge time of the capacitors C11, C 11', and C 11", a cycle of the second clock signal OSC2 output to the output terminal of the third oscillator 213 also becomes shorter.

As described above, the PTAT bias unit 20 may output the first PTAT bias voltage VBP1 and the second PTAT bias voltage VBP2 of the level determined according to the temperature, and the second frequency generator 21 may control the frequency of the second clock signal OSC2 with the charge time and the discharge time of the capacitors C11, C11', and C11" of the respective oscillators 211, 212, and 213.

If the levels of the first PTAT bias voltage VBP1 and the second PTAT bias voltage VBP2 are set such that the same quantity of current flows in the first transistors M11, M11', and M11" and the fourth transistors M14, M14', and M14", the charge time t1 and the discharge time t2 of the capacitors C11, C11', and C11" become the same, so that the second clock signal OSC2 has the cycle, T=t1+t2, and a duty, (½)T.

Hereinafter, embodiments of various configurations of the second frequency generator 21 will be described. A description of the same constituent element as that of the second frequency generator 21 described with reference to FIG. 2 will be omitted, and a difference will be mainly described.

Figure 3:
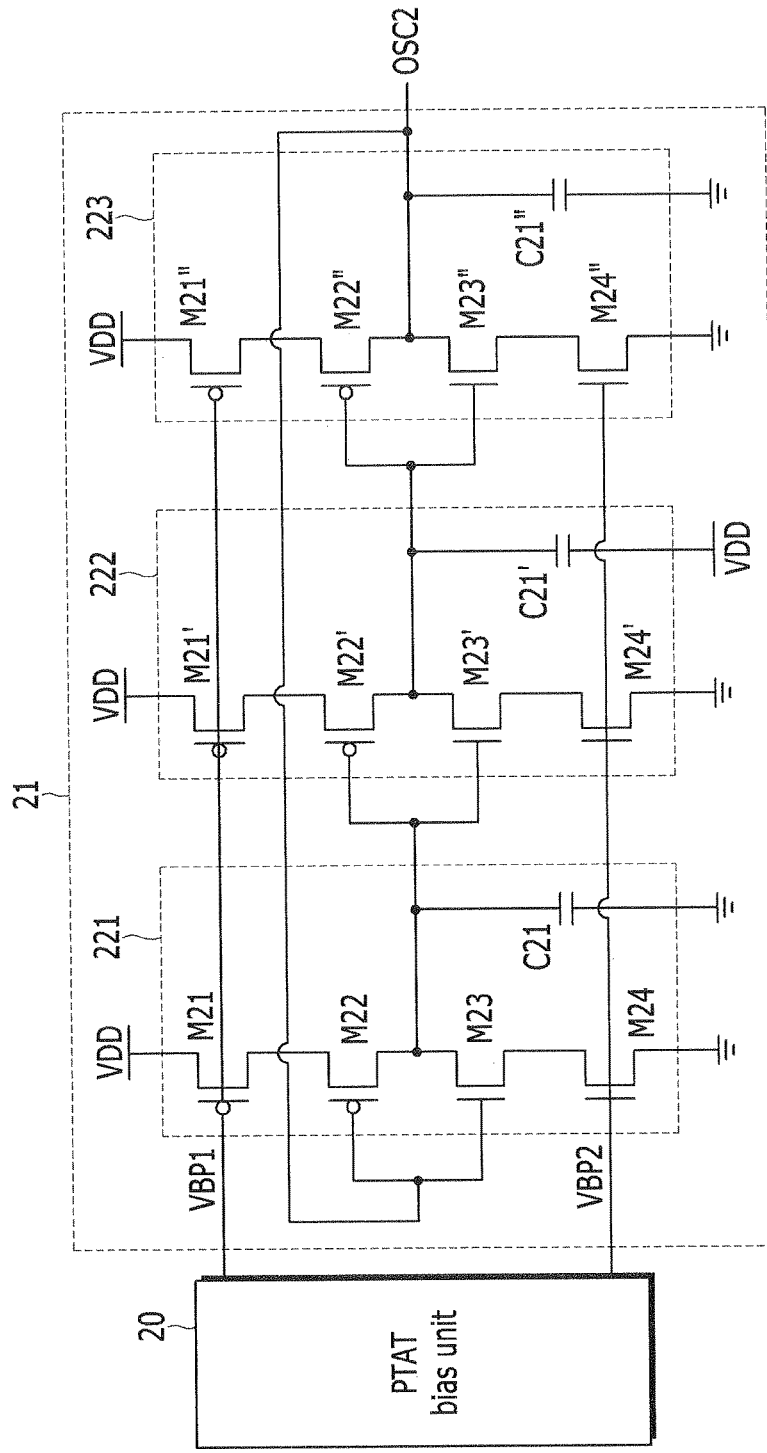
FIG. 3 is a circuit diagram illustrating a second frequency generator constructed with the principle of another embodiment of the present invention.

FIG. 3 is a circuit diagram illustrating a second frequency generator constructed with the principle of another embodiment of the present invention.

As a difference from FIG. 2, opposite ends of capacitors C21 and C21" included in a first oscillator 221 and a third oscillator 223 are connected to the ground and an opposite end of the capacitor C21' included in a second oscillator 222 is connected to the power source voltage VDD. That is, the opposite ends of the capacitors C21, C21', and C21" included in oscillators 221, 222, and 223 may be alternately connected to the ground and the power source voltage VDD.

When the opposite ends of the capacitors C21, C21', and C21" included in the plurality of oscillators 221, 222, and 223 are alternately connected to the ground and the power source voltage VDD, a characteristic difference between devices may be offset.

The configuration other than the connection configuration of the capacitors C21, C21', and C21" is the same as that of FIG. 2, so a detailed description of the same configuration will be omitted.

Figure 4:
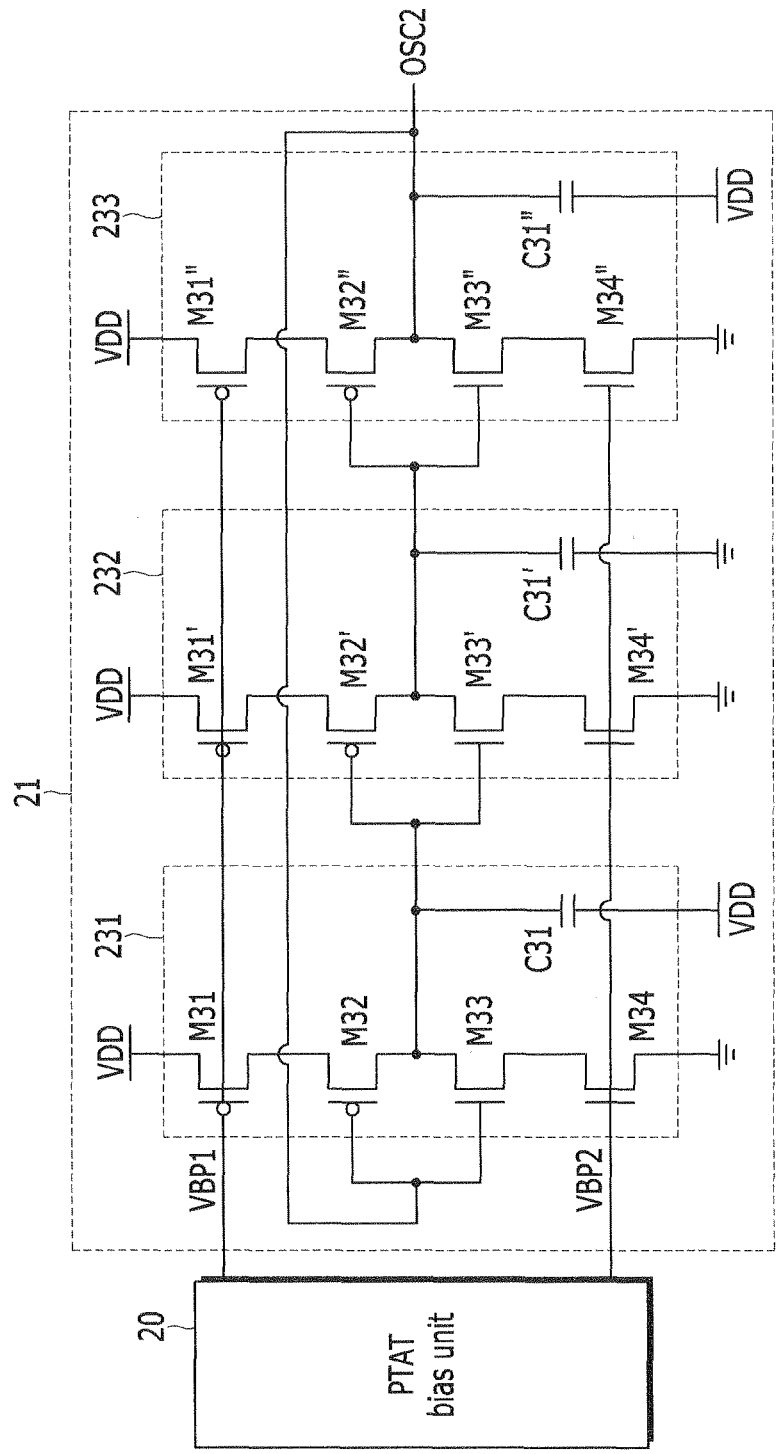
FIG. 4 is a circuit diagram illustrating a second frequency generator constructed with the principle of yet another embodiment of the present invention.

FIG. 4 is a circuit diagram illustrating a second frequency generator constructed with the principle of yet another embodiment of the present invention.

As a difference from FIG. 2, opposite ends of capacitors C31 and C31" included in a first oscillator 231 and a third oscillator 233 are connected to the power source voltage VDD and an opposite end of the capacitor C31' included in a second oscillator 232 is connected to the ground. That is, the opposite ends of the capacitors C21, C21', and C21" included in a plurality of oscillators 221, 222, and 223 are configured to be alternately connected to the ground and the power source voltage VDD.

The configuration other than the connection configuration of the capacitors C31, C31', and C31" is the same as that of FIG. 2, so a detailed description of the same configuration will be omitted.

Figure 5:
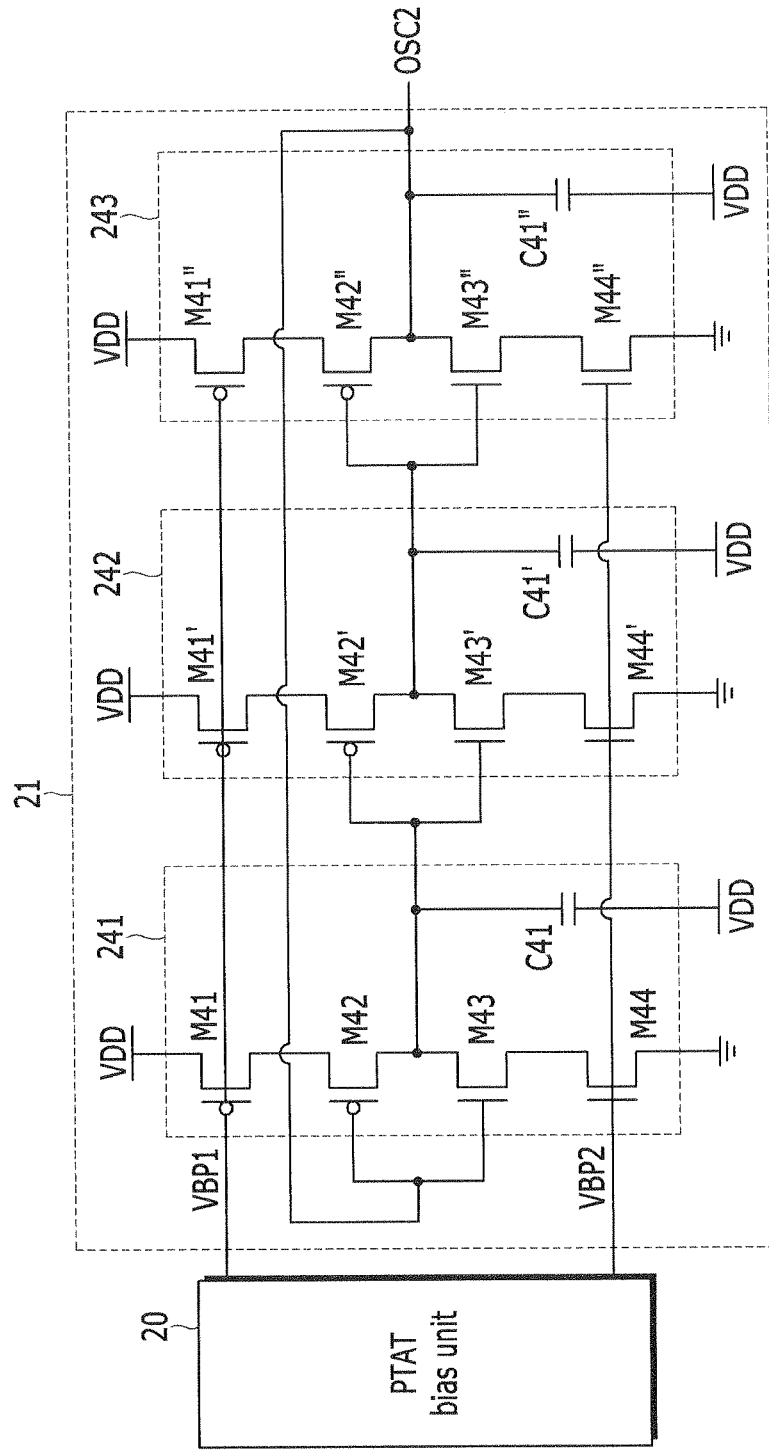
FIG. 5 is a circuit diagram illustrating a second frequency generator constructed with the principle of still yet another embodiment of the present invention.

FIG. 5 is a circuit diagram illustrating a second frequency generator constructed with the principle of still yet another embodiment of the present invention.

As a difference from FIG. 2, opposite ends of capacitors C41, C41', and C41" included in oscillators 241, 242, and 243 are connected to the power source voltage VDD.

The configuration other than the connection configuration of the capacitors C31, C31', and C31" is the same as that of FIG. 2, so a detailed description of the same configuration will be omitted.

Figure 6:
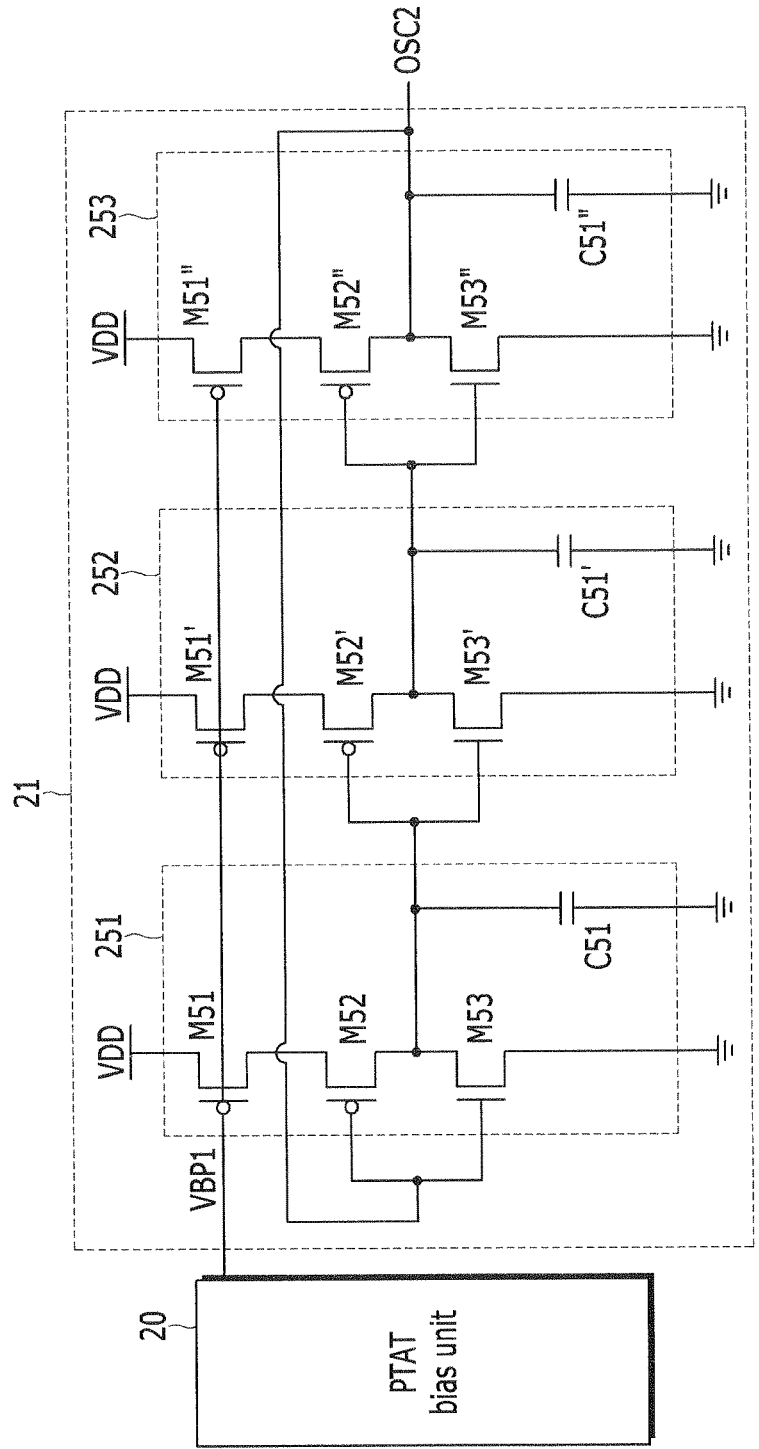
FIG. 6 is a circuit diagram illustrating a second frequency generator constructed with the principle of still yet another embodiment of the present invention.

FIG. 6 is a circuit diagram illustrating a second frequency generator constructed with the principle of still yet another embodiment of the present invention.

As a difference from FIG. 2, a fourth transistor is not included in each of the oscillators 251, 252, and 253. That is, opposite ends of third transistors M53, M53', and M53" included in the plurality of oscillators 251, 252, and 253 are connected to the ground. The PTAT bias unit 20 applies only the first PTAT bias voltage VBP1 to the second frequency generator 21.

When the fourth transistor is not included in each of the oscillators 251, 252, and 253, the second frequency generator 21 may accurately implement only a time at which the second clock signal OSC2 rises.

It is sufficient for the second counter 22 of the temperature sensing device 100 to count only the number of pulses of the second clock signal OSC2. Accordingly, even when the second frequency generator 21 accurately implements only the time at which the second clock signal OSC2 rises, the second counter 22 may count the number of pulses of the second clock signal OSC2 by counting a time at which the second clock signal OSC2 rises.

Figure 7:
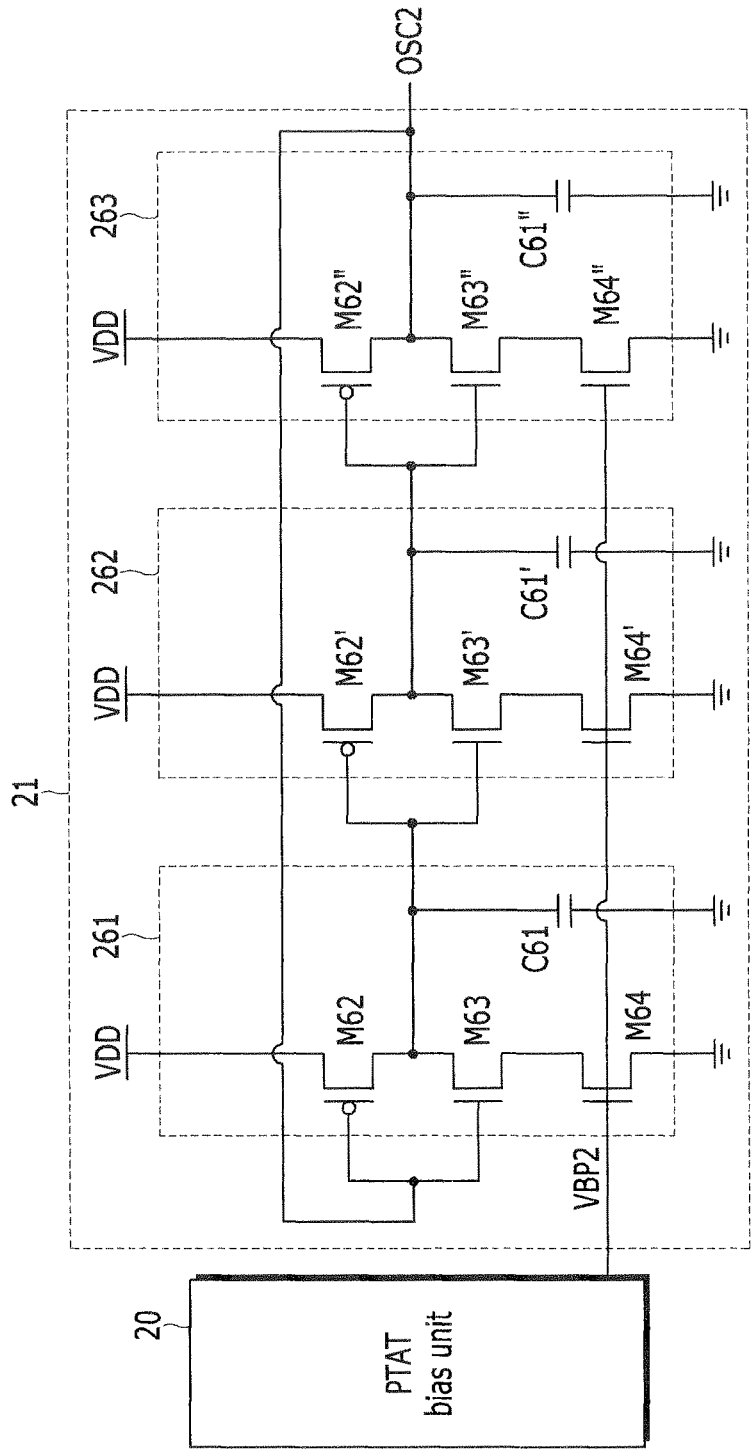
FIG. 7 is a circuit diagram illustrating a second frequency generator constructed with the principle of still yet another embodiment of the present invention.

FIG. 7 is a circuit diagram illustrating a second frequency generator constructed with the principle of still yet another embodiment of the present invention.

As a difference from FIG. 2, the first transistor is not included in each of the plurality of oscillators 261, 262, and 263. That is, one ends of the second transistor M62, M62', and M62" included in the respective oscillators 261, 262, and 263 are connected to the power source voltage VDD. The PTAT bias unit 20 applies only the second PTAT bias voltage VBP2 to the second frequency generator 21.

When the first transistor is not included in each of oscillators 261, 262, and 263, the second frequency generator 21 may accurately implement only a time at which the second clock signal OSC2 falls.

It is sufficient for the second counter 22 of the temperature sensing device 100 to count only the number of pulses of the second clock signal OSC2. Accordingly, even when the second frequency generator 21 accurately implements only the time at which the second clock signal OSC2 falls, the second counter 22 may count the number of pulses of the second clock signal OSC2 by counting a time at which the second clock signal OSC2 falls.

Figure 8:
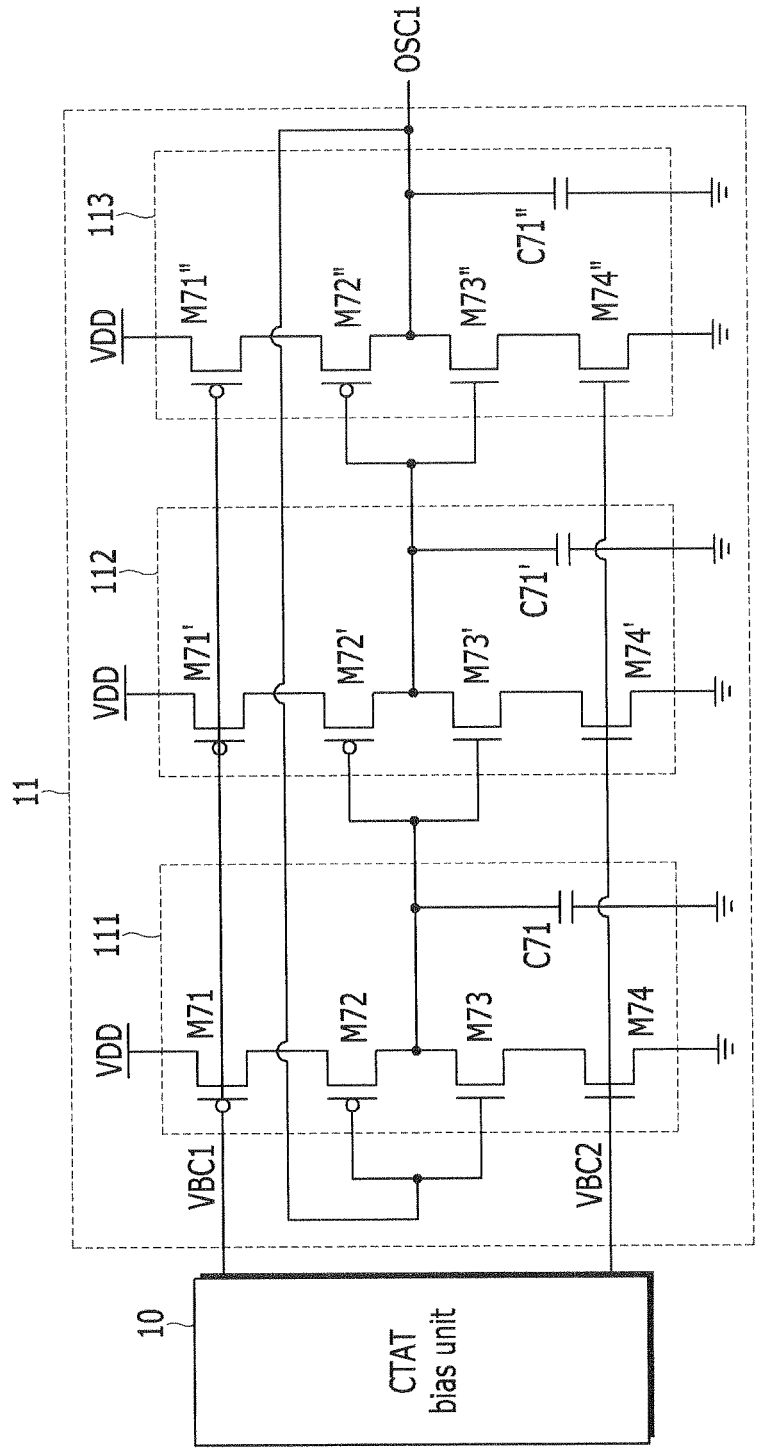
FIG. 8 is a circuit diagram illustrating a first frequency generator constructed with the principle of an embodiment of the present invention.

FIG. 8 is a circuit diagram illustrating the first frequency generator constructed with the principle of an embodiment of the present invention.

In reference to FIG. 8, the first frequency generator 11 includes oscillators 111, 112, and 113.

The first oscillator 111 includes a first transistor M71, a second transistor M72, a third transistor M73, a fourth transistor M74, which are connected in series between a power source voltage VDD and a ground, and a capacitor C71 connected to an output terminal. The first transistor M71 and the second transistor M72 are the PMOS transistors, and the third transistor M73 and the fourth transistor M74 are the NMOS transistors.

A gate electrode of the first transistor M71 is connected to a first CTAT bias voltage VBC1 of a CTAT bias unit 10, and a gate electrode of the fourth transistor M74 is connected to a second CTAT bias voltage VBC2 of the CTAT bias unit 20. A gate electrode of the second transistor M72 and a gate electrode of the third transistor M73 are connected to an output terminal of the third oscillator 113.

The capacitor C71 includes one electrode connected to the output terminal between the second transistor M72 and the third transistor M73 and another electrode connected to a ground.

The second oscillator 112 is configured in the same manner as the first oscillator 111. However, a gate electrode of a second transistor M72' and a gate electrode of a third transistor M73' are connected to an output terminal of the first oscillator 111.

The third oscillator 113 is configured in the same manner as the first oscillator 111. However, a gate electrode of a second transistor M72" and a gate electrode of a third transistor M73" are connected to an output terminal of the second oscillator 112.

That is, the oscillators 111, 112, and 113 included in the first frequency generator 11 are configured in the same manner as the frequency oscillators 211, 212, and 213 of FIG. 2.

In addition, it is a matter of course that the plurality of oscillators 111, 112, and 113 included in the first frequency generator 11 may be configured in the same manner as any one of the oscillators 221, 231, 241, 251, and 261 included in the second frequency generator 21 described with reference to FIGS. 3 to 7.

The CTAT bias unit 10 outputs the first CTAT bias voltage VBC1 and the second CTAT bias voltage VBC2 at a constant level regardless of a temperature. Accordingly, a quantity of currents flowing the first transistors M71, M71', and M71" and the fourth transistors M74, M74', and M74" of the respective oscillators 111, 112, and 113 is constant. Accordingly, a charge time and a discharge time of the capacitors C71, C71', and C71" connected to the output terminal of the respective oscillators 111, 112, and 113 are constant, and the first clock signal OSC 1 is also output in a constant cycle.

Figure 9:
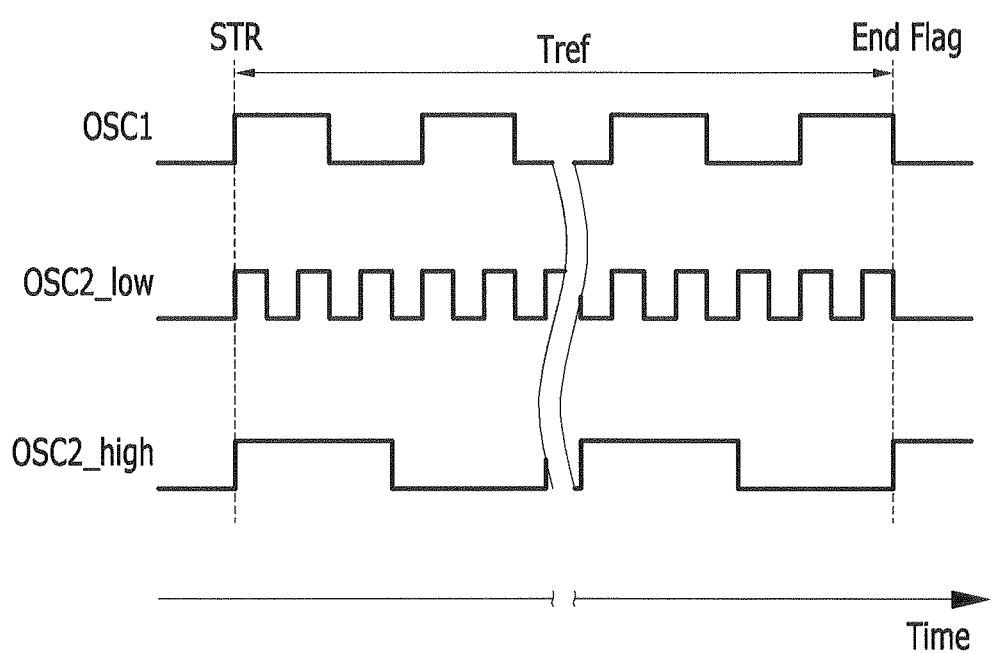
FIG. 9 shows waveforms varying with time illustrating a method of driving a temperature sensing device constructed with the principle of an embodiment of the present invention.
Figure 12:
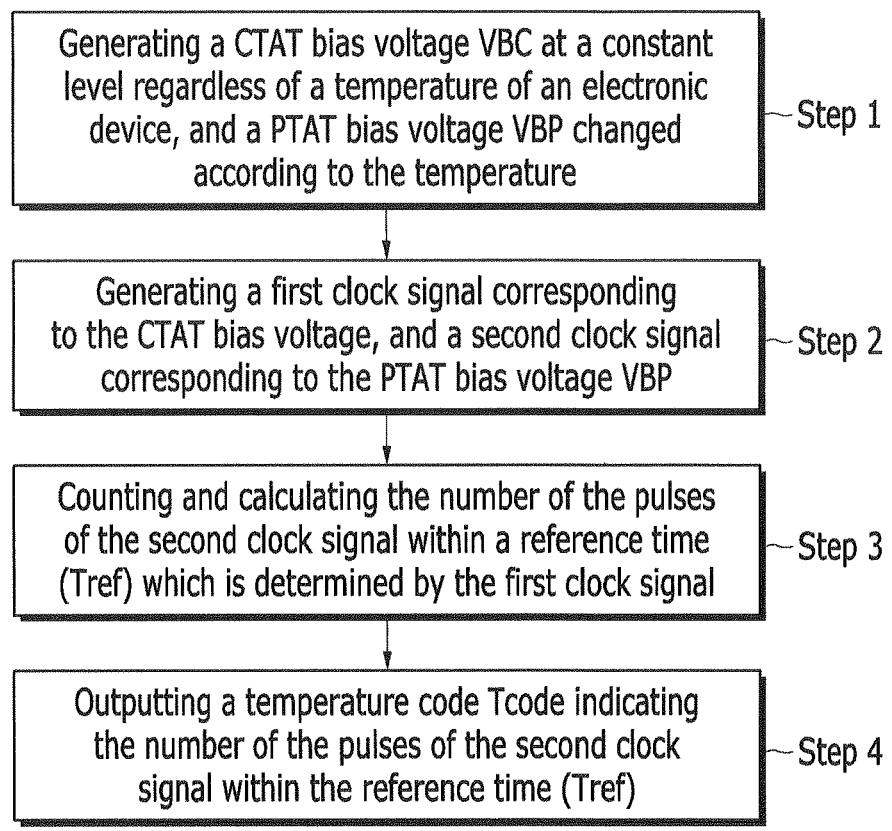
FIG. 12 is a flow chart illustrating a method of driving a temperature sensing device according to the principle of an embodiment of the present invention.

FIG. 9 shows waveforms varying with time illustrating a method of driving a temperature sensing device constructed with the principle of an embodiment of the present invention. FIG. 12 is a flow chart illustrating a method of driving a temperature sensing device according to the principle of an embodiment of the present invention.

In reference to FIGS. 9 and 12, the method of driving the temperature sensing device 100 will be first described.

In Step 1 of FIG. 12, the CTAT bias unit 10 of the temperature sensing device 100 generates the CTAT bias voltage VBC at a constant level regardless of a temperature, and the PTAT bias unit 20 generates the PTAT bias voltage VBP changed according to a temperature.

In Step 2 of FIG. 12, the controller 30 drives the temperature sensing device 100 by transferring the driving start signal (DS) to the first frequency generator 11, the first counter 12, the second frequency generator 21, the second counter 22, and the start detector 31 in order to start the temperature measurement. The first frequency generator 11 outputs the first clock signal OSC1 according to the applied CTAT bias voltage VBC, and the first counter 12 counts the number of pulses of the first clock signal OSC1. Then, the second frequency generator 21 outputs the second clock signal OSC2 according to the applied PTAT bias voltage VBP, and the second counter 22 counts the number of pulses of the second clock signal OSC2.

In Step 3 of FIG. 12, when the start detector 31 receives the driving start signal DS, the start detector 31 starts sensing of a temperature by transferring the start signal STR to the synchronization unit 32. When the start detector 31 transfers the start signal STR to the synchronization unit 32, the synchronization unit 32 simultaneously transfers the first synchronization signal Sync1 to the end detector 13 and the data holding unit 23. Accordingly, the end detector 13 starts the measurement of the reference time Tref. The end detector 13 starts the measurement of the reference time Tref and the data holding unit 23 simultaneously stores a first value of the second number signal NF2.

When the number of pulses of the first clock signal OSC1 reaches a predetermined threshold, the end detector 13 outputs the end flag. A time at which the number of pulses of the first clock signal OSC1 reaches the predetermined threshold is the reference time Tref. That is, the end detector 13 detects the reference time Tref at which the number of pulses of the first clock signal OSC1 reaches the predetermined threshold.

When the synchronization unit 32 receives the end flag from the end detector 13, the synchronization unit 32 transfers the second synchronization Sync2 to the data holding unit 23.

The data holding unit 23 stores a second value of the second number signal NF2 at a time point at which the second synchronization signal Sync2 is received. The data holding unit 23 may calculate the number of pulses of the second clock signal OSC2 counted for the reference time Tref by subtracting the first value from the second value of the second number signal NF2.

In Step 4 of FIG. 12, the data holding unit 23 outputs the temperature code Tcode indicating the number of pulses of the second clock signal OSC2 counted for the reference time Tref.

When the temperature code Tcode is output, the controller 30 may stop the measurement of the reference time Tref by transferring the driving stop signal DSS to the first frequency generator 11 and the second counter 12.

As illustrated in FIG. 9, a time period from the output of the start signal STR to the output of the end flag becomes the reference time Tref. The reference time Tref is a time at which the pulses of the first block signal OSC1 are output as many as the predetermined threshold.

The number of pulses of the second clock signal OSC2 is counted for the reference time Tref that is the time from the time of the output of the start signal STR to the time of the output of the end flag. The larger number of pulses of the second clock signal OSC2_low output at a lower temperature may be counted for the reference time Tref. The smaller number of pulses of the second clock signal OSC2_high output at a higher temperature may be counted for the reference time Tref.

Figure 10:
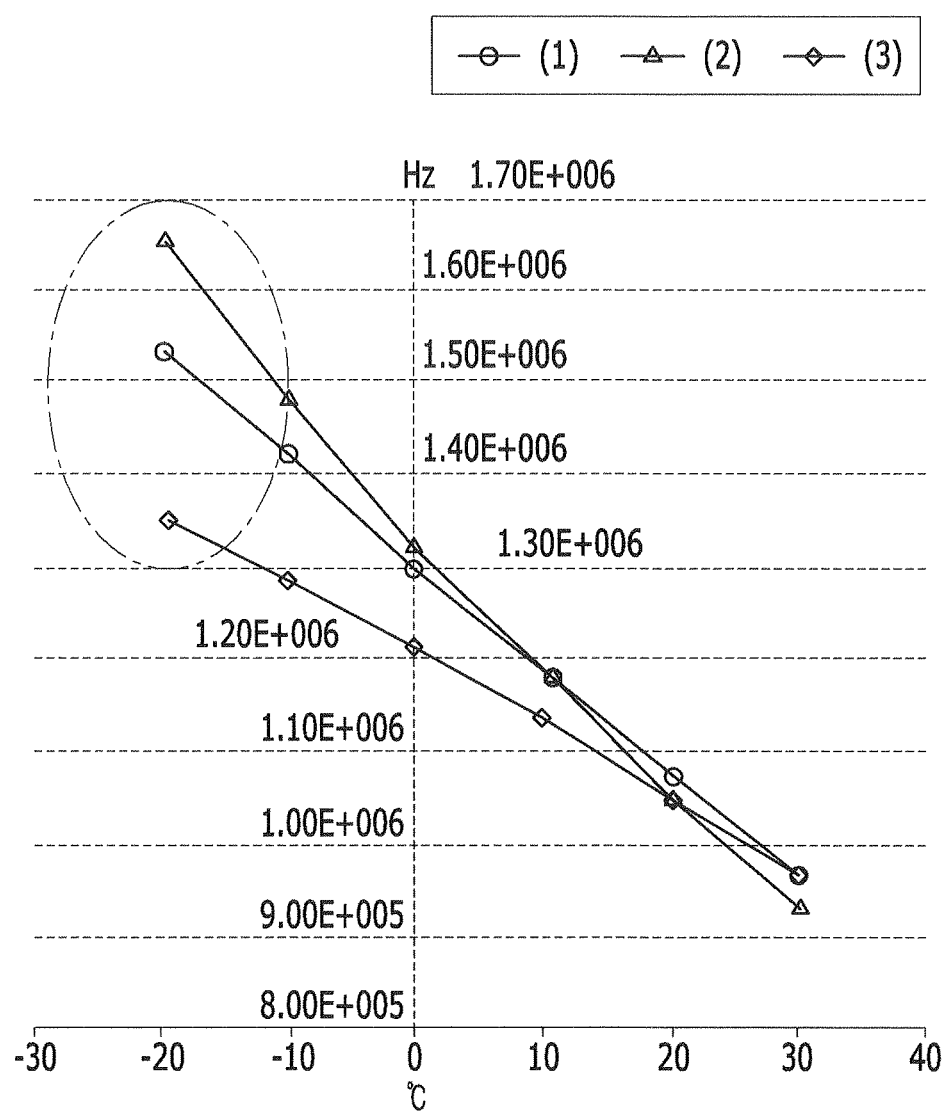
FIG. 10 is a graph illustrating a frequency deviation according to a temperature of a contemporary temperature sensing device.

FIG. 10 is a graph illustrating a frequency deviation according to a temperature of a contemporary temperature sensing device. A horizontal axis indicates a temperature (° C.), and a vertical axis indicates a frequency (Hz).

In reference to FIG. 10, cases (1), (2), and (3) in which the oscillator is configured without the capacitor in a process of manufacturing the temperature sensing device are illustrated.

In comparison of the frequencies of the temperature sensing devices (1), (2), and (3) according to a temperature, it can be seen that a frequency deviation according to a temperature is small at a higher temperature, but the frequency deviation according to a temperature increases as a temperature becomes lower. This means that performance of the temperature sensing device is deteriorated at a lower temperature.

Figure 11:
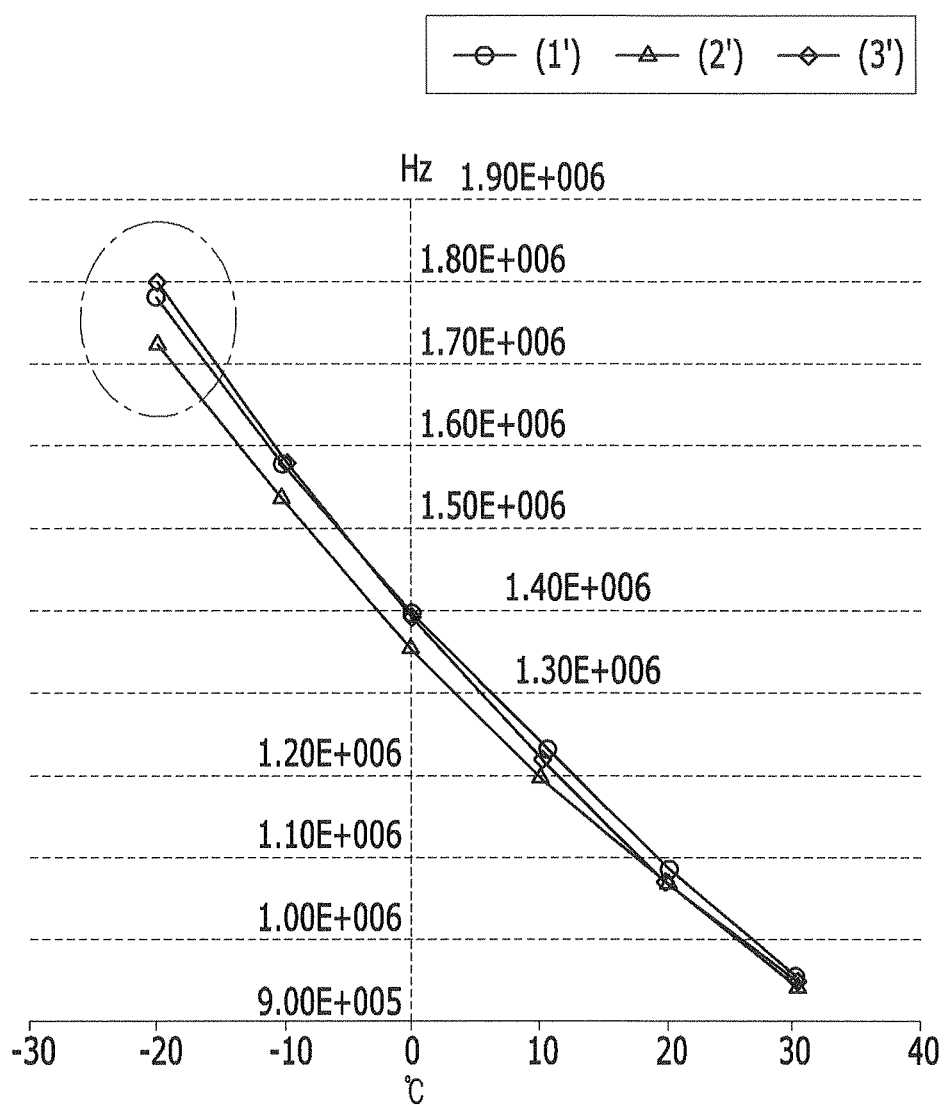
FIG. 11 is a graph illustrating a frequency deviation according to a temperature of a temperature sensing device constructed with the principle of an embodiment of the present invention.

FIG. 11 is a graph illustrating a frequency deviation according to a temperature of a temperature sensing device constructed with the principle of an embodiment of the present invention. A horizontal axis indicates a temperature (° C.), and a vertical axis indicates a frequency (Hz).

In reference to FIG. 11, cases (1'), (2'), and (3') in which the oscillator including the capacitor is configured in a process of manufacturing the temperature sensing device are illustrated. In comparison of the frequencies of the temperature sensing devices (1'), (2'), and (3') according to a temperature, it can be seen that a frequency deviation according to a temperature is small at a lower temperature, as well as at a higher temperature. Further, it can be seen that a tendency of the frequency according to the temperature becomes constant. This means that the performance of the temperature sensing device at a lower temperature was improved.

That is, the capacitor is included in the oscillator of the temperature sensing device, so that the temperature sensing device is insensitive to the change in the process, thereby being capable of improving the performance of the temperature sensing device.

The foregoing referenced drawings and detailed description of the present invention are all exemplary and used for explaining the present invention, and do not limit the meaning or the scope of the present invention defined in the claims. Accordingly, those skilled in the art will appreciate that various modifications and equivalent another embodiment may be possible. Accordingly, the true technical protection scope of the present invention will be defined by the technical spirit of the accompanying claims.

What is claimed is:

1. A temperature sensing device, comprising:
    a first frequency generator generating a first clock signal having a first frequency that is constant regardless of a temperature;
    a second frequency generator generating a second clock signal having a second frequency that is changed according to the temperature; and
    a data holding unit outputting a temperature code indicating a number of pulses of the second clock signal counted for a reference time at which a number of pulses of the first clock signal reaches a predetermined threshold.

2. The temperature sensing device of claim 1, further comprising:
    a complementary to absolute temperature (CTAT) bias unit for applying a CTAT bias voltage at a constant level regardless of the temperature to the first frequency generator.

3. The temperature sensing device of claim 1, further comprising:
    a first counter generating a first number signal by counting the number of pulses of the first clock signal.

4. The temperature sensing device of claim 3, further comprising:
    an end detector receiving the first number signal and outputting an end flag when a value of the first number signal is increased to a threshold which corresponds to the predetermined threshold of the number of pulses of the first clock signal.

5. The temperature sensing device of claim 4, further comprising:
    a second counter generating a second number signal by counting the number of pulses of the second clock signal.

6. The temperature sensing device of claim 5, further comprising:
    a controller transferring a driving start signal to the first frequency generator and to the second frequency generator.

7. The temperature sensing device of claim 6, further comprising:
    a start detector generating a start signal when the driving start signal is received by the start detector.

8. The temperature sensing device of claim 7, further comprising:

a synchronization unit generating a first synchronization signal according to the start signal and generating a second synchronization signal according to the end flag.

9. The temperature sensing device of claim 8, wherein:
the end detector reads the value of the first number signal at a time point at which the first synchronization signal is received, and transfers the end flag to the synchronization unit when the value of the first number signal is increased to the threshold.

10. The temperature sensing device of claim 8, further comprising:
the data holding unit receiving the second number signal from the second counter, storing a first value of the second number signal at the time point at which the first synchronization signal is received, and calculating the number of pulses of the second clock signal counted for the reference time by subtracting the first value from a second value of the second number signal at a time point at which the second synchronization signal is received.

11. The temperature sensing device of claim 1, further comprising:
a proportional to absolute temperature (PTAT) bias unit for applying a PTAT bias voltage changed according to the temperature to the second frequency generator.

12. The temperature sensing device of claim 11, wherein:
the second frequency generator comprises
a plurality of oscillators for feeding back and inputting the second clock signal in response to the PTAT bias voltage, and outputting the second clock signal.

13. The temperature sensing device of claim 12, wherein:
each of the plurality of oscillators comprises:
a first PMOS transistor, a second PMOS transistor, a third NMOS transistor, and a fourth NMOS transistor connected in series between a power source voltage and a ground; and
a capacitor including one electrode connected to an output terminal between the second PMOS transistor and the third NMOS transistor and another electrode connected to the power source voltage.

14. The temperature sensing device of claim 12, wherein:
each of the plurality of oscillators comprises:
a first PMOS transistor, a second PMOS transistor, and a third NMOS transistor connected in series between a power source voltage and a ground; and
a capacitor including one electrode connected to an output terminal between the second PMOS transistor and the third NMOS transistor and another electrode connected to the ground.

15. The temperature sensing device of claim 12, wherein:
each of the plurality of oscillators comprises:
a second PMOS transistor, a third NMOS transistor, and a fourth NMOS transistor connected in series between a power source voltage and a ground; and
a capacitor including one electrode connected to an output terminal between the second PMOS transistor and the third NMOS transistor and another electrode connected to the ground.

16. The temperature sensing device of claim 12, wherein:
one of the plurality of oscillators comprises:
a first PMOS transistor, a second PMOS transistor, a third NMOS transistor, and a fourth NMOS transistor connected in series between a power source voltage and a ground; and
a first capacitor including one electrode connected to an output terminal between the second PMOS transistor and the third NMOS transistor and another electrode connected to a ground.

17. The temperature sensing device of claim 16, wherein:
another one of the plurality of oscillators comprises:
the first PMOS transistor, the second PMOS transistor, the third NMOS transistor, and the fourth NMOS transistor connected in series between a power source voltage and the ground; and
a second capacitor including one electrode connected to an output terminal between the second PMOS transistor and the third NMOS transistor and another electrode connected to the power source voltage.

18. A method of driving a temperature sensing device, comprising:
generating a first clock signal having a first frequency that is constant regardless of a temperature;
generating a second clock signal having a second frequency that is changed according to the temperature;
counting a number of pulses of the first clock signal;
counting a number of pulses of the second clock signal;
detecting a reference time at which the number of pulses of the first clock signal reaches a predetermined threshold; and
outputting a temperature code indicating a number of pulses of the second clock signal counted for the reference time.

19. The method of claim 18, further comprising:
when the temperature code is output, generating a driving stop signal for stopping the generation of the first clock signal.

20. The method of claim 18, further comprising:
generating a driving start signal for enabling generation of the first clock signal and the second clock signal.

21. The method of claim 20, further comprising:
generating a start signal for starting sensing of the temperature according to the driving start signal; and
generating a first synchronization signal for starting measurement of the reference time according to the start signal.

22. The method of claim 21, wherein:
the counting of the number of pulses of the first clock signal comprises steps of
increasing a value of a first number signal by one whenever one pulse of the first clock signal is counted, and
outputting the first number signal.

23. The method of claim 22, wherein:
the detecting of the reference time comprises
outputting an end flag when the value of the first number signal at a time point at which the first synchronization signal is generated is increased to a threshold which corresponds to the predetermined threshold of the number of pulses of the first clock signal.

24. The method of claim 23, wherein:
the counting of the number of pulses of the second clock signal comprises steps of
increasing a value of a second number signal by one whenever one pulse of the second clock signal is counted, and
outputting the second number signal.

25. The method of claim 24, wherein:
the outputting of the temperature code comprises
calculating the number of pulses of the second clock signal counted for the reference time by subtracting the first value of the second number signal at the time point at which the first synchronization signal is generated from a second value of the second number signal at a time point at which the end flag is output.

* * * * *